US009832290B2

(12) United States Patent
Manur et al.

(10) Patent No.: US 9,832,290 B2
(45) Date of Patent: Nov. 28, 2017

(54) PROTOCOL INDEPENDENT MULTICAST REGISTER OPTIMIZATION

(71) Applicant: Juniper Networks, Inc., Sunnyvale, CA (US)

(72) Inventors: Rajesh Shetty Manur, Bangalore (IN); Navaneeth Y V, Bangalore (IN); Abhishek Asthana, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

(21) Appl. No.: 14/883,292

(22) Filed: Oct. 14, 2015

(65) Prior Publication Data

US 2017/0093689 A1   Mar. 30, 2017

(30) Foreign Application Priority Data

Sep. 30, 2015   (IN) ............................ 5225/CHE/2015

(51) Int. Cl.
*H04L 29/06* (2006.01)
*H04L 12/18* (2006.01)

(52) U.S. Cl.
CPC .............. *H04L 69/28* (2013.01); *H04L 12/18* (2013.01); *H04L 65/4076* (2013.01)

(58) Field of Classification Search
None
See application file for complete search history.

(56) References Cited

U.S. PATENT DOCUMENTS

| | | | | |
|---|---|---|---|---|
| 7,818,757 B1 * | 10/2010 | Tsimelzon | .............. | G06F 9/546 709/231 |
| 8,374,116 B2 * | 2/2013 | Kitchin | ................. | H04W 16/14 370/315 |
| 8,510,551 B1 * | 8/2013 | Desai | .................. | H04L 63/0236 709/224 |
| 8,537,816 B2 * | 9/2013 | Anumala | ............ | H04L 12/1886 370/389 |
| 8,625,465 B1 * | 1/2014 | Aggarwal | ............... | H04L 12/18 370/255 |

(Continued)

OTHER PUBLICATIONS

Serbest et al., "Supporting IP Multicast over VPLS," Internet Draft, Internet Engineering Task Force, Jul. 1, 2005, 47 pp.

(Continued)

*Primary Examiner* — Bunjob Jaroenchonwanit
(74) *Attorney, Agent, or Firm* — Shumaker & Sieffert, P.A.

(57) ABSTRACT

An example method includes receiving, by a first hop router (FHR) and from a source device, multicast stream data associated with a multicast stream, sending, from the FHR and to a rendezvous point (RP) using a Protocol Independent Multicast (PIM) protocol, one or more null register messages that are each associated with the multicast stream. Each of the one or more null register messages includes a source address and a group address that are collectively associated with the multicast stream, and each of the one or more null register messages further includes an indication to request that the RP refrain from sending any register-stop messages associated with the multicast stream to the FHR. The example method further includes, after sending the one or more null register messages that are each associated with the multicast stream, sending, to the RP, the multicast stream data in a non-encapsulated format.

18 Claims, 6 Drawing Sheets

(56) References Cited

U.S. PATENT DOCUMENTS

| | | | |
|---|---|---|---|
| 2005/0141545 A1* | 6/2005 | Fein | H04B 7/0617 |
| | | | 370/445 |
| 2007/0211735 A1 | 9/2007 | Williamson | |
| 2008/0175240 A1* | 7/2008 | Suzuki | H04L 12/18 |
| | | | 370/390 |
| 2009/0103468 A1* | 4/2009 | Kasapidis | H04L 12/185 |
| | | | 370/312 |
| 2010/0054245 A1 | 3/2010 | Asati et al. | |
| 2010/0303072 A1 | 12/2010 | Jokela et al. | |
| 2011/0228770 A1 | 9/2011 | Dholakia et al. | |
| 2011/0286450 A1 | 11/2011 | Wijnands | |
| 2013/0188638 A1* | 7/2013 | Venaas | H04L 12/185 |
| | | | 370/390 |
| 2014/0254591 A1* | 9/2014 | Mahadevan | H04L 45/16 |
| | | | 370/390 |
| 2014/0269412 A1 | 9/2014 | Venaas et al. | |
| 2015/0085640 A1* | 3/2015 | Song | H04L 12/4641 |
| | | | 370/219 |

OTHER PUBLICATIONS

Macker, Simplified Multicast Forwarding, RFC 6621, Internet Engineering Task Force, May 18, 2012, 55 pp.

Sarikaya et al., "Multicast Support for Mapping of Address and Port Protocol and Light Weight 4over6," Internet Draft, Network Working Group, Sep. 29, 2014, 25 pp.

Aggarwal et al. "BGP Encodings and Procedures for Multicast in MPLS/BGP IP VPNs" Internet Engineering Task Force (IETF), RFC 6514, Feb. 2012, 59 pgs.

Aggarwal et al. "IPv4 and IPv6 Infrastructure Addresses in BGP Updates for Multicast VPN" Internet Engineering Task Force (IETF), RFC 6515, Feb. 2012, 8 pgs.

Farinacci et al, "A Reliable Transport Mechanism for PIM," Internet Engineering Task Force, RFC 6559, Mar. 2012, 29 pp.

Fenner et al., "Protocol Independent Multicast—Sparse Mode (PIM-SM): Protocol Specification (Revised)," Network Working Group, RFC 4601, Aug. 2006, 112 pp.

Peter et al. "PIM Source Discovery in Last-Hop-Router" draft-anish-pim-stream-discovery-00, Protocol Independent Multicast (pim), Internet Draft, Mar. 9, 2015, 11 pgs.

Peter et al. "Reliable Transport for PIM Register States" draft-anish-reliable-pim-registers-00, Protocol Independent Multicast (pim), Internet Draft, Mar. 9, 2015, 19 pgs.

Wijnands et al., "PIM flooding mechanism and source discovery," Network Working Group, draft-ietf-pim-source-discovery-bsr-01, Jul. 3, 2014, 10 pp.

Wijnands et al. "Multicast using Bit Index Explicit Replication" draft-wijnands-bier-architecture-04, Internet Engineering Task Force, Internet-Draft, Feb. 2, 2015, 30 pgs.

U.S. Appl. No. 14/576,830, filed Dec. 19, 2014 entitled Enhanced Protocol Independent Multicast Source Registration Over a Reliable Transport.

U.S. Appl. No. 14/728,021, filed Jun. 2, 2015 entitled Multicast Flow Overlay Using Registration Over a Reliable Transport.

* cited by examiner

NULL REGISTER MESSAGE FORMAT

| PIM VER 150 | TYPE 152 | RESERVED 154 | CHECKSUM 156 |
|---|---|---|---|
| B 158 | N 160 | R 162 | RESERVED2 164 |
| MULTICAST STREAM INFORMATION (SOURCE ADDRESS, GROUP ADDRESS) 166 ||||

FIG. 5

PROTOCOL INDEPENDENT MULTICAST REGISTER OPTIMIZATION

This application claims the benefit of India Patent Application 5225/CHE/2015, filed Sep. 30, 2015, the entire contents of which are hereby incorporated by reference.

TECHNICAL FIELD

This disclosure relates to computer networks, and, more particularly, to transmission of multicast stream data over such networks.

BACKGROUND

A computer network is a collection of interconnected computing devices that exchange data and share resources. In a packet-based network, the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPN's), local area network (LAN's), virtual LANs (VLAN's) and the like. Computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, a computer network may utilize Protocol Independent Multicast (PIM) as a multicast routing protocol to build distribution trees through the computer network to transport multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR). PIM SM may also support Any-Source Multicast (ASM) mode.

SUMMARY

In one example, a method includes receiving, by a first hop router (FHR) and from a source device, multicast stream data associated with a multicast stream, and sending, from the FHR and to a rendezvous point (RP) using a Protocol Independent Multicast (PIM) protocol, one or more null register messages that are each associated with the multicast stream provided by the source device, wherein each of the one or more null register messages associated with the multicast stream includes a source address and a group address that are collectively associated with the multicast stream, and wherein each of the one or more null register messages associated with the multicast stream further includes an indication to request that the RP refrain from sending any register-stop messages associated with the multicast stream to the FHR. The example method further includes, after sending the one or more null register messages that are each associated with the multicast stream, sending, from the FHR and to the RP, the multicast stream data associated with the multicast stream in a non-encapsulated format.

In one example, a routing device includes a control unit comprising at least one processor. The control unit is configured to receive, from a source device, multicast stream data associated with a multicast stream, and to send, to an RP using a PIM protocol, one or more null register messages that are each associated with the multicast stream provided by the source device, wherein each of the one or more null register messages associated with the multicast stream includes a source address and a group address that are collectively associated with the multicast stream, and wherein each of the one or more null register messages associated with the multicast stream further includes an indication to request that the RP refrain from sending any register-stop messages associated with the multicast stream to the routing device. The control unit is further configured to, after sending the one or more null register messages associated with the multicast stream, send, to the RP, the multicast stream data associated with the multicast stream in a non-encapsulated format.

In one example, a computer-readable storage medium includes instructions that, when executed, cause at least one processor of a first hop router (FHR) to perform operations. The operations include receiving, from a source device, multicast stream data associated with a multicast stream, and sending, to an RP using a PIM protocol, one or more null register messages that are each associated with the multicast stream provided by the source device, wherein each of the one or more null register messages associated with the multicast stream includes a source address and a group address that are collectively associated with the multicast stream, and wherein each of the one or more null register messages associated with the multicast stream further includes an indication to request that the RP refrain from sending any register-stop messages associated with the multicast stream to the FHR. The operations further include, after sending the one or more null register messages associated with the multicast stream, sending, to the RP, the multicast stream data associated with the multicast stream in a non-encapsulated format.

In one example, a method includes receiving, by an RP and from a FHR using a PIM protocol, one or more null register messages that are each associated with a multicast stream, wherein each of the one or more null register messages includes a source address and a group address that are collectively associated with the multicast stream, and wherein each of the one or more null register messages further includes an indication to request that the RP refrain from sending any register-stop messages associated with the multicast stream to the FHR. The example method further includes, after receiving the one or more null register messages, receiving, by the RP and from the FHR, multicast stream data associated with the multicast stream in a non-encapsulated format, wherein responsive to receiving the one or more null register messages, the RP refrains from sending any register-stop messages associated with the multicast stream to the FHR.

In one example, a routing device includes a control unit comprising at least one processor. The control unit is configured to receive, from a first hop router (FHR) using a Protocol Independent Multicast (PIM) protocol, one or more null register messages that are each associated with a multicast stream, wherein each of the one or more null register messages includes a source address and a group address that are collectively associated with the multicast stream, and wherein each of the one or more null register messages further includes an indication to request that the routing device refrain from sending any register-stop messages associated with the multicast stream to the FHR. The control unit is further configured to, after receiving the one or more null register messages, receive, from the FHR, multicast stream data associated with the multicast stream in a non-encapsulated format, wherein responsive to receiving the one or more null register messages, the routing device refrains from sending any register-stop messages associated with the multicast stream to the FHR.

In one example, a computer-readable storage medium includes instructions that, when executed, cause at least one processor of a rendezvous point (RP) to perform operations. The operations include receiving, by the RP and from a first hop router (FHR) using a Protocol Independent Multicast (PIM) protocol, one or more null register messages that are each associated with a multicast stream, wherein each of the one or more null register messages includes a source address and a group address that are collectively associated with the multicast stream, and wherein each of the one or more null register messages further includes an indication to request that the RP refrain from sending any register-stop messages associated with the multicast stream to the FHR. The operations further include, after receiving the one or more null register messages, receiving, by the RP and from the FHR, multicast stream data associated with the multicast stream in a non-encapsulated format, wherein responsive to receiving the one or more null register messages, the RP refrains from sending any register-stop messages associated with the multicast stream to the FHR.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a conceptual diagram illustrating an example packet format of a null register message.

DETAILED DESCRIPTION

As described in Network Working Group RFC 4601 ("Protocol Independent Multicast-Sparse Mode (PIM-SM): Protocol Specification (Revised)," Fenner et al., August 2006, hereinafter "RFC 4601"), the entire content of which is incorporated herein by reference, a centralized router called a rendezvous point (RP) may be employed to allow receiver devices to interact with source devices via one or more intermediate routers. These interactions may be channeled via a first hop router (FHR), which is communicatively coupled to one or more source devices, and a last hop router (LHR), which is communicatively coupled to one or more receiver devices.

One mechanism by which a FHR and a RP may communicate is through the transmission of special messages called as register messages, such as data register messages, null register messages, and register-stop messages, as described in RFC 4601. The FHR and the RP may each maintain a respective register state machine for each of the active multicast flows, or streams. As the number of multicast flows increases, however, the number of register states that need to be maintained by the FHR and RP increases, and the number of register messages exchanged between the FHR and the RP, which are proportional to the number of multicast flows, also increases, which can potentially negatively impact the performance of both the RP and the FHR.

As is described in further detail below, techniques of the present disclosure reduce the number of register messages that are exchanged between the FHR and the RP, and may also reduce the number of states that are maintained by the respective register state machines of the FHR and the RP. These techniques may eliminate the use of data register packets altogether, which are traditionally used for multicast stream data encapsulation, and may also reduce the number of timers that are implemented by the FHR. The techniques may further eliminate the use of register-stop messages traditionally sent by the RP in response to null register messages. As a result, the implementation of the techniques of the present disclosure may potentially result in higher network scalability for certain multicast services like customer multicast, Internet-protocol television (IPTV), content replication between data centers, and the like.

Figure 1:
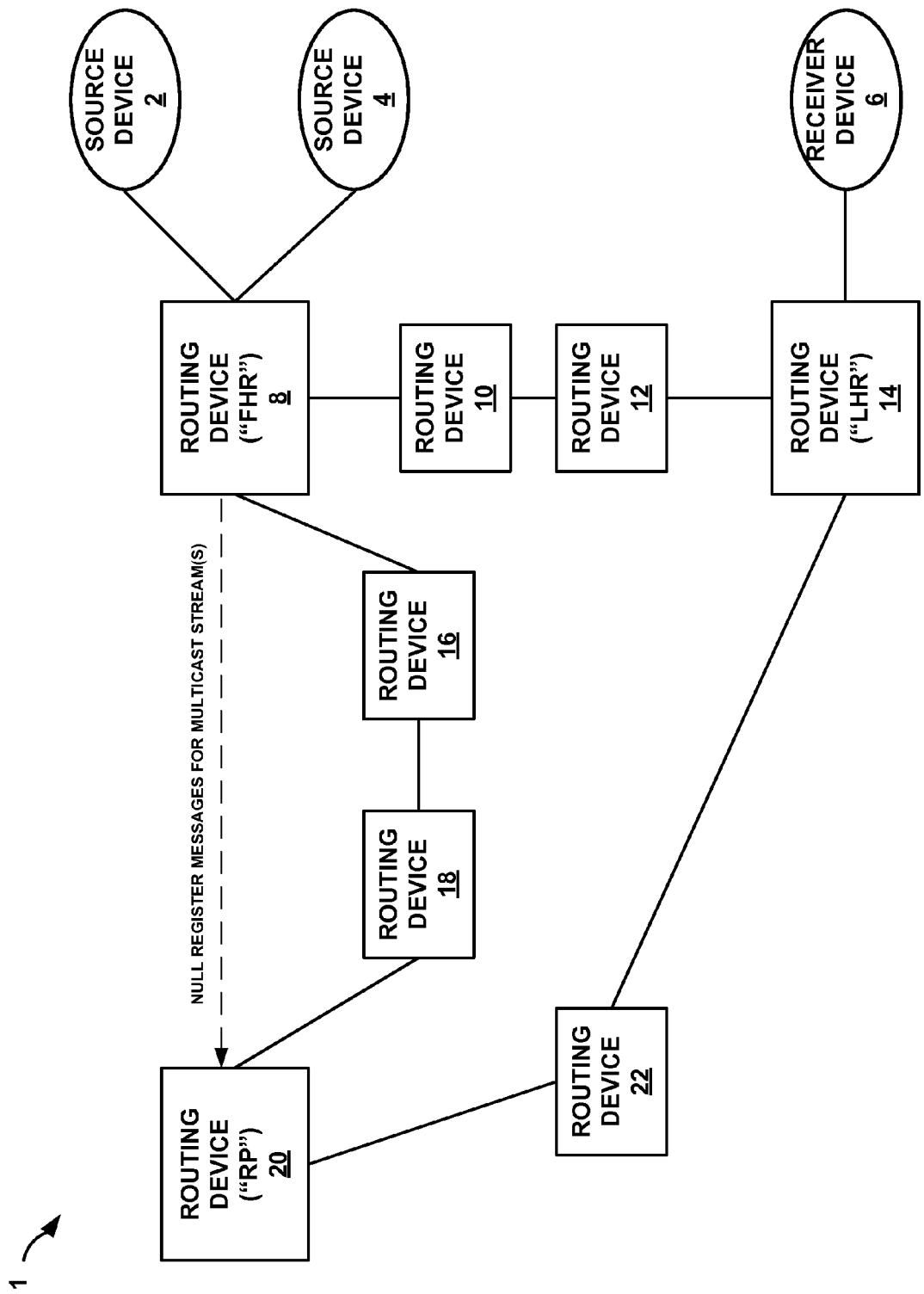
FIG. 1 is a block diagram illustrating an example network comprising multiple routing devices, including a rendezvous point (RP) and a first hop router (FHR).

FIG. 1 is a block diagram illustrating an example network 1 comprising multiple routing devices 8, 10, 12, 14, 16, 18, 20, and 22, which include an RP 20 and a FHR 8. Routing devices 8, 10, 12, 14, 16, 18, 20, and 22 are each configured to route multicast traffic between at least one source device and at least one receiver device and may comprise edge routers and/or core routers. Two example source devices 2, 4 and one example receiver device 6 are illustrated in FIG. 1, although, in other examples, any number of source devices, receiver devices, and routing devices may be included in network 1. Examples of multicast traffic may include content for Internet Protocol Television (IPTV), desktop conferences, corporate broadcasts, music and video web casts, and other forms of multimedia content.

Source devices 2, 4 are communicatively coupled FHR 8 in this example, and receiver device 6 is communicatively coupled to LHR 14. Although only one FHR 8 and one LHR 14 are shown in FIG. 1, in other examples, any number of FHR's and LHR's may be communicatively coupled to RP 20 via one or more intermediary routing devices, such as routing devices 10, 12, 16, 18, and 22. Similarly, although only one RP 20 is shown in FIG. 1, in other examples, any number of RP's may be included in network 1 and communicatively coupled to FHR 8 and LHR 14.

Network 1 may be an enterprise network, a campus network, a service provider network, a home network, or another autonomous system. In any of these examples, source devices 2, 4 and receiver 6 may share data via network 1. In one example of network 1 as an enterprise network, each of source devices 2, 4 and receiver device 6 may comprise one or more servers or employee computer terminals located in different regions of a single office location. In another example of network 1 as an enterprise network, each of source devices 2, 4 and receiver device 6 may comprise a remote office location of a corporation such that enterprise network 1 may be extended across a public network, such as the Internet. Additionally, however, the techniques of this disclosure are applicable to other network types, both public and private. Examples of other network types include local area networks (LAN's), virtual local area networks (VLAN's), virtual private networks (VPN's), and the like. In some examples, network 1 may be coupled to one or more additional private or public networks, e.g., the Internet. In other examples, network 1 may comprise the Internet or another public network. In some cases, network 1 may comprise a multi-protocol label switching (MPLS) network.

Network 1 may utilize Protocol Independent Multicast (PIM) as a multicast routing protocol to build distribution trees through network 1 to transport multicast traffic from sources 2, 4 to receiver 6 for particular multicast groups. PIM may operate in several different modes, such as Sparse Mode (SM), which may also support Any-Source Multicast (ASM). RP 20 is a routing device toward which multicast traffic from source devices 2, 4 and receiver devices 6 rendezvous. RP 20 may serve as a root of a shared distribution tree for a range of multicast groups. In the illustrated example, RP 20, FHR 8, LHR 14, and routing devices 16, 18, and 22 carry multicast traffic through computer network 1 via a shared tree from source devices 2, 4 to receiver device 6. This shared tree may include one or more paths that transport multicast traffic upstream, e.g., from source devices 2, 4 via FHR 8 towards RP 20, as well as downstream, e.g., away from RP 20 towards receiver device 6 via LHR 14. FHR 8, LHR 14, and routing devices 10, 12 may also, in some cases, carry multicast traffic through computer network 1 via another (e.g., shortest path) tree from source devices 2, 4 to receiver device 6, where this tree also may include one or more paths that transport multicast traffic between FHR 8 and LHR 14.

Receiver device 6 may subscribe to one or more multicast groups to receive multicast traffic. RP 20 may learn and store source addresses associated with source devices (e.g., source devices 2, 4) for a certain range of multicast groups to which receiver device 6 belongs. RP 20, FHR 8, LHR 14, and routing devices 10, 12, 16, 18, and 22 communicate using PIM control messages, including join requests and prune requests, to propagate requests to join or leave a multicast group from receivers (e.g., receiver device 6) upstream toward the source (e.g., source device 2, 4) of the multicast traffic.

As an example, when LHR 14 detects that receiver device 6 is to receive traffic for a particular multicast group, LHR 14 may send a (*, G) join control message towards RP 20. More specifically, LHR 14 may determine an address of RP 20, which is responsible for the multicast group range that includes the particular multicast group. LHR 14 sends a (*, G) join control message because LHR 14 does not know the source of the multicast group. When an upstream routing device, e.g., routing device 22, receives the (*, G) join control message, routing device 22 forwards the join control message further upstream towards RP 20. In addition, (*, G) multicast tree state is instantiated in each routing device, e.g., routing device 22, that the (*, G) join control message passes through on the way to RP 20. According to this process, routing devices may conceptually build a shared tree across network 1. Upon receipt, RP 20 processes the (*, G) join control message and may begin sending multicast traffic for the multicast group to LHR 14 upon its availability. LHR 14 provides the received multicast traffic to receiver device 6.

PIM SM typically uses group state to natively forward multicast traffic for a multicast group from source devices 2, 4 toward RP 20 for distribution to all devices in the shared tree that belong to the multicast group. For example, FHR 8 may forward multicast traffic upstream from source device 2 toward RP 20 via routing devices 16, 18. RP 20, in turn, forwards the multicast traffic downstream to routing device 22 and LHR 14, which have state for the multicast group, and towards receiver device 6.

In conventional PIM SM, FHR 8 may initially tunnel multicast traffic from source devices 2, 4 to RP 20 as control-plane payload traffic using PIM register mechanisms. Initially, the multicast traffic may comprise unicast-encapsulated data packets referred to as PIM register messages. Conventionally, there are three possible states per multicast flow on FHR 8: (1) the send state; (2) the suppress state, and (3) the probe state. FHR 8 may maintain a register state machine for each of the active multicast flows, or streams. As the number of multicast flows increases, the number of register states maintained and the number of register messages exchanged with RP 20 also increases. For purposes of background only, the following paragraphs will briefly describe the use of these conventional states.

The initial state of FHR 8 is the send state, in which multicast traffic is encapsulated and sent to RP 20 as data register messages. RP 20 learns about active multicast sources from received data register messages, and if RP 20 has interest in a particular multicast group (e.g., based upon previously receiving a join message from LHR 14 to express interest in this group by receiver device 6), it sends a join control message to FHR 8 to pull native multicast traffic from one or more of source devices 2, 4. After RP 20 has initiated source-specific joins towards source devices 2, 4 to instantiate (S, G) multicast tree state in routing devices 16, 18, source devices 2, 4 eventually begin natively forwarding non-encapsulated data packets to RP 20 via FHR 8. To avoid processing two copies of individual data packets (e.g., encapsulated and non-encapsulated copies), RP 20 may send register-stop messages to FHR 8 to prevent FHR 8 from unnecessarily sending the unicast-encapsulated data packets to RP 20.

FHR 8 moves to the suppress state upon receiving a register-stop message from RP 20. In the suppress state, no more encapsulation is required, and therefore the encapsulated interface will be removed by FHR 8, and data register messages are no longer sent to RP 20. FHR 8 starts a timer upon entering the suppress state, and upon expiration of this timer, FHR 8 sends RP 20 a null register message. Upon sending a null register message to RP 20, FHR 8 moves into the probe state, which is a transient state while FHR 8 is waiting for register-stop message from RP 20. A register probe timer is started by FHR 8 upon entering the probe state. If FHR 8 receives a register-stop message prior to expiration of the register probe timer (e.g., five seconds), FHR 8 stops the timer and moves back to the suppress state. However, if the register probe timer expires before FHR 8 receives a register-stop message from RP 20, FHR 8 restarts encapsulation of multicast traffic in PIM data register messages and moves to the send state.

This conventional approach, however, may have certain drawbacks. PIM register messages typically are not handled isolated in the data-plane alone or in the control-plane alone, as both functions are usually involved in the register mechanism. Additionally, data register messages, register-stop messages, and null-register messages conventionally support carrying only the information about a single (S, G) stream. Thus, as one example, in a standard Ethernet frame, there may be information for a large number of (S, G) streams, and the conventional approach may cause RP 20 to send a large volume of register-stop messages, as well as cause FHR 8 to send an equally large volume of null-register messages to RP 20, which may serve as a potentially serious bottleneck for PIM-ASM scaling.

For instance, for every null register message sent by FHR 8, RP 20 must respond with a register-stop message prior to expiration of the register probe timer. As one non-limiting example, if there are 40,000 different multicast streams, FHR 8 may send 40,000 null register messages in a given period, or one null register message for each multicast stream. RP 20 must then periodically (e.g., every five seconds) respond with 40,000 respective register-stop messages prior to expiration of the register probe timer. For every register-stop message that is not received by FHR 8 prior to expiration of the register probe timer, FHR 8 may have to re-attach the encapsulation interface and resume encapsulation of multicast traffic using data register messages in the send state. In addition, RP 20 may need to process these extra data register messages and respond with extra register-stop messages. As a result, this added overhead can be a direct cause of higher processor utilization, and thereby impact the performance, of both RP 20 and FHR 8.

The techniques of the present disclosure may eliminate the use of data register packets altogether, and may also reduce the number of register states and timers that are implemented at FHR 8, which effectively helps reduce processing overhead. For example, rather than implementing the send state, the suppress state, and the probe state at FHR 8, as described in the conventional approach above, FHR 8 may provide only a single state for each active multicast stream, namely an "active" state, which replaces the conventional suppress state. The conventional send and probe states may effectively be eliminated, thereby optimizing the register state machine at FHR 8. In addition, the use of the register probe timer, as described above, may be eliminated. The techniques of the present disclosure also eliminate the use of register-stop messages sent by RP 20 in response to null register messages sent by FHR 8, thereby reducing the number of packets that are transmitted by RP 20, reducing network congestion, and improving network scalability.

As will be described in further detail below, upon receiving multicast traffic from one or more of sources 2, 4, FHR 8 may send a null register message to RP 20 in order to inform RP 20 about the active stream (e.g., source and group address information associated with the stream). Subsequently, periodic null register messages are sent by FHR 8 to RP 20 to keep RP 20 informed about the active stream. FHR 8 enters and remains in the active state for a given active multicast stream upon receiving multicast data from one or sources 2, 4 associated with this stream.

FHR 8 is configured to send a null register message to RP 20 and start a timer that is herein referred to as the "register active" timer. Upon expiration of this timer, FHR 8 sends a new null register message to RP 20 and restarts the timer. Each null register message may include a bit, or field, having a value to indicate that RP 20 is not required to send any register-stop messages associated with the given stream. Upon receiving these null register messages, RP 20 refrains from sending register-stop messages associated with the given stream to FHR 8.

As one non-limiting example, FHR 8 may receive, from source device 2, multicast stream data associated with a multicast stream, and may send, to RP 20 using a PIM protocol, one or more null register messages that are each associated with the multicast stream. Each of the one or more null register messages includes a source address and a group address that are collectively associated with the multicast stream, and each of the one or more null register messages further includes an indication to request that RP 20 refrain from sending any register-stop messages associated with the multicast stream to FHR 8. After sending the one or more null register messages, FHR 8 sends, to RP 20, the multicast stream data in a non-encapsulated format (e.g., data not encapsulated in any PIM data register messages).

In various examples, after sending a first null register message, FHR 8 receives, from the RP 20, a join control message (e.g., join message 32 shown in FIG. 2) that includes the source address and the group address collectively associated with the multicast stream. For instance, RP 20 may send such a join control message if receiver 6 has previously expressed interest in receiving multicast traffic data associated with the group address (e.g., via a join message previously sent to RP 20 via LHR 14). In these examples, sending the multicast stream data in the non-encapsulated format from FHR 8 to RP 20 may include, after receiving the join control message, sending, from FHR 8 and to RP 20, the multicast stream data in the non-encapsulated format.

In various examples, RP 20 may receive, from FHR 8 using a PIM protocol, one or more null register messages that are each associated with a multicast stream, where each of the one or more null register messages includes a source address and a group address that are collectively associated with the multicast stream, and where each of the one or more null register messages further includes an indication to request that RP 20 refrain from sending any register-stop messages associated with the multicast stream to FHR 8. After receiving the one or more null register messages, RP 20 receives, from FHR 8, multicast stream data associated with the multicast stream in a non-encapsulated format. Responsive to receiving the one or more null register messages from FHR 8, RP 20 refrains from sending any register-stop messages associated with the multicast stream to FHR 8.

In such fashion, the techniques of the present disclosure may provide a mechanism to eliminate the use of conventional PIM data register messages and register-stop messages exchanged between RP 20 and FHR 8, and generally reduce the volume of register messages that are exchanged in network 1. FHR 8 may avoid sending encapsulated multicast traffic data to RP 20, thereby reducing the processing overhead and burden on RP 20 when routing such traffic to receivers (e.g., receiver device 6) in network 1. As a result, the encapsulation interface at FHR 8 may be eliminated, as well as any associated route modifications associated with encapsulation interface changes. The techniques may provide an overall optimization to the register mechanism that results in potentially higher route scaling of network 1.

Figure 2:
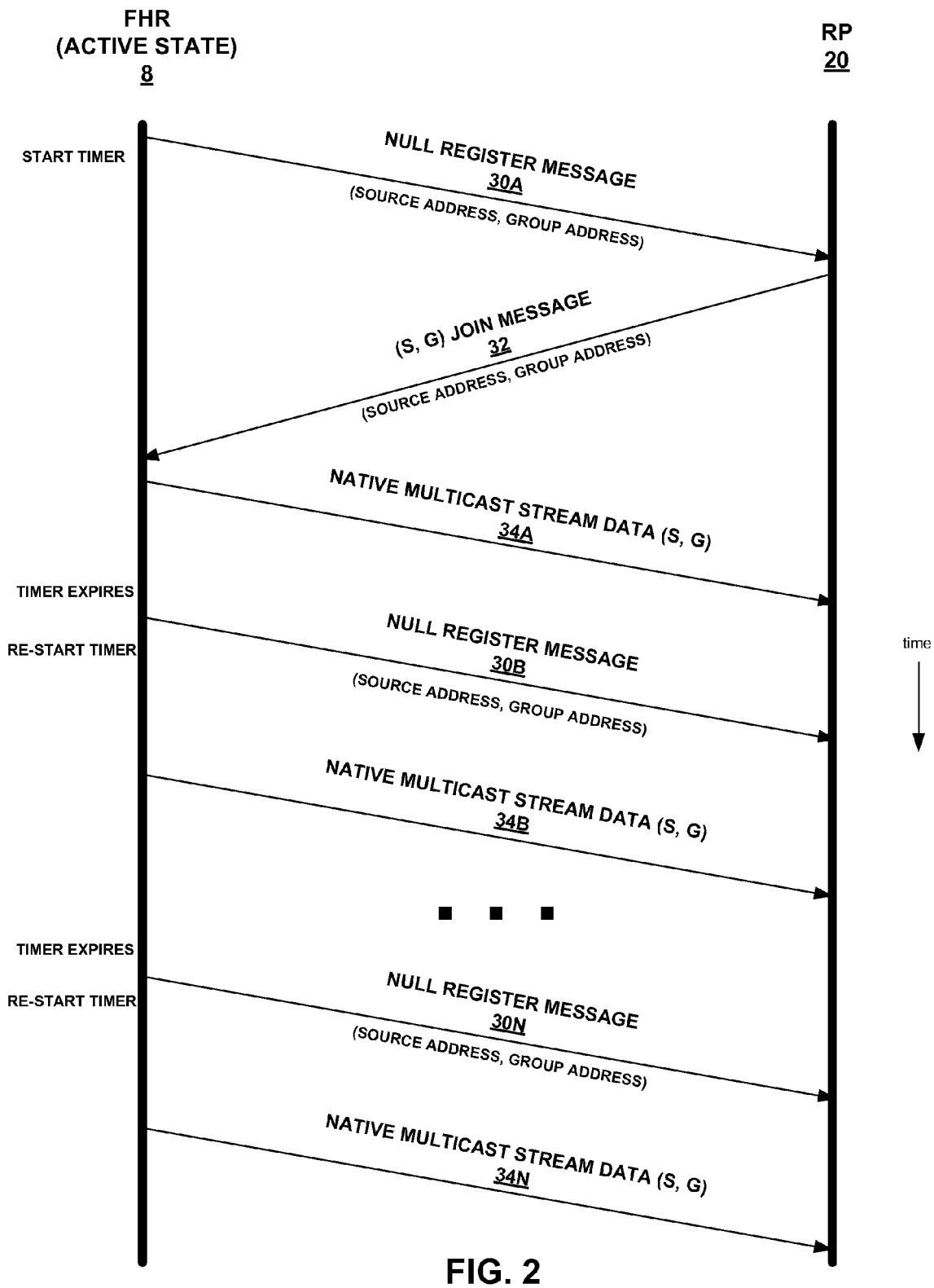
FIG. 2 is a diagram illustrating an example message flow between the RP and FHR shown in FIG. 1.

FIG. 2 is a diagram illustrating an example message flow between RP 20 and FHR 8 of FIG. 1. FIG. 2 illustrates one non-limiting example of such a message flow. Initially, after receiving traffic data associated with a particular multicast stream from a source device (e.g., source device 2), FHR 8 may enter an active state and send a first null register message 30A to RP 20. Null register message 30A includes a source address and a group address that are collectively associated with this particular multicast stream, and null register message 30A may have a message format that conforms with the example format shown in FIG. 5, as one non-limiting example. Additionally, upon sending null register message 30A, FHR 8 may start a register active timer (e.g., 60 seconds).

Upon receiving null register message 30A, RP 20 may determine that it will send a join control message 32 in order to receive multicast traffic data associated with the multicast stream associated with the source address and group address included in null register message 30A. For example, RP 20 may determine that it has interest in receiving multicast traffic data associated with this stream based upon an expressed interest in this data by one or more receiver devices communicatively coupled to RP 20 in network 1. For example, RP 20 may have previously received a join message from LHR 14 to express an interest by receiver device 6 in data associated with this group address, and/or data associated with both this group address and source address. In instances such as these, RP 20 may determine to send join control message 32.

RP 20 sends the join control message 32 to FHR 8, where join message 32 specifies the source address and group address for the multicast stream. In addition, upon determining to join the multicast stream, RP 20 may update, based on null register message 30A, state information for multicast streams that are active at RP 20, where the state information may identify the source address and the group address included in null register message 30A. For example, RP 20 may update the state information for this multicast stream within state information 98 shown in FIG. 4 (e.g., in stream state information 109).

FHR 8 receives join control message 32, which includes the source address and the group address associated with the multicast stream. After receiving join control message 32, FHR 8 sends multicast stream data 34A to RP 20. Multicast stream data 34A includes data for the multicast stream associated with the source address and group address included in join control message 32 and also null register message 30A, and multicast stream data 34A is provided in the native, non-encapsulated format in which it was received by FHR 8 from the source device (e.g., source device 2). That is, multicast stream data 34A is not encapsulated within any PIM data register messages.

In addition, upon receiving join control message 32, FHR 8 may update its state information for multicast streams that are active at FHR 8 and processed by RP 20. For example, FHR 8 may update the state information for this multicast stream within state information 98 shown in FIG. 4 (e.g., in stream state information 109), including the source address and the group address associated with the stream.

Figure 3:
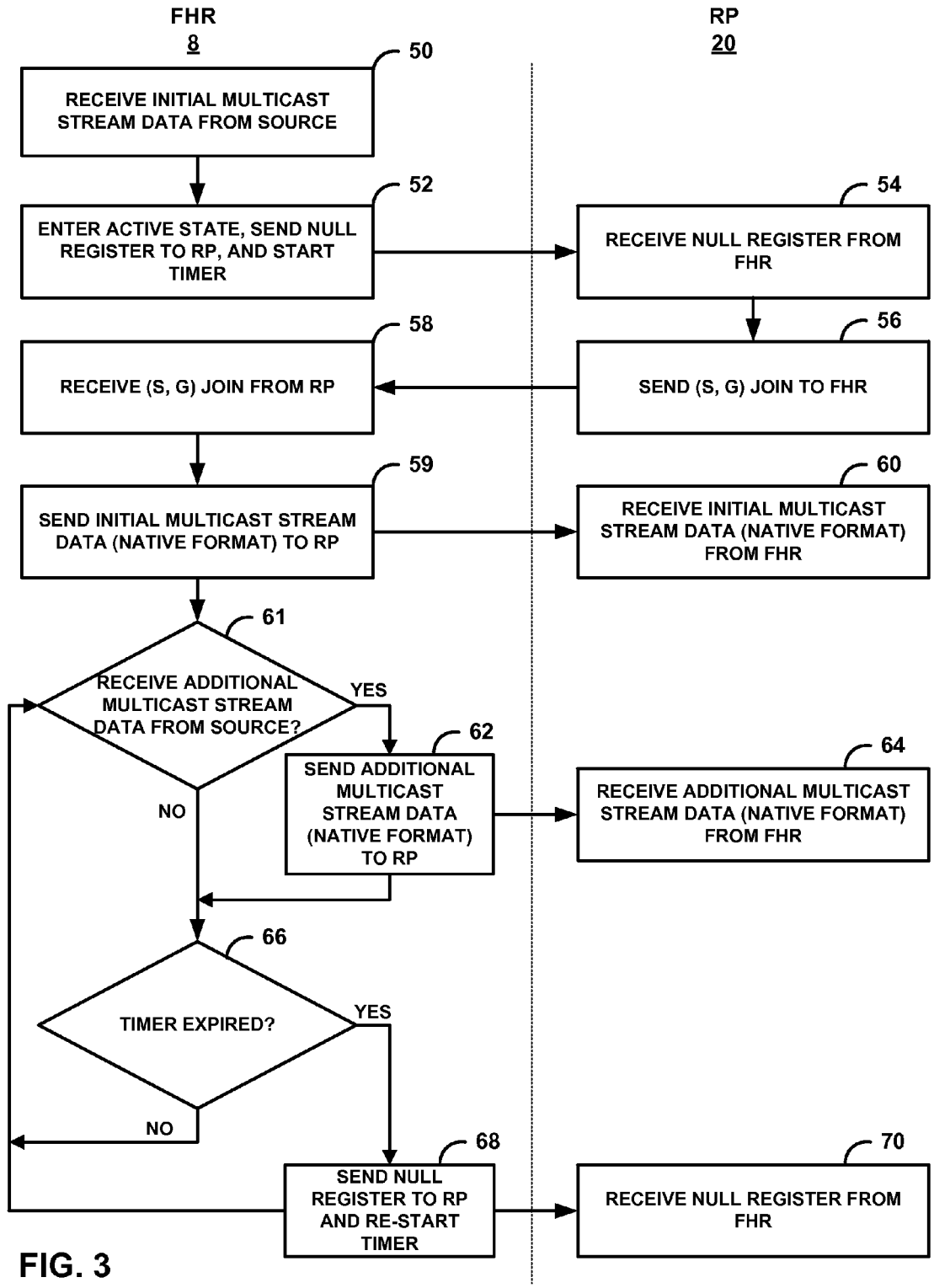
FIG. 3 is a flow diagram illustrating an example process that includes operations performed by the RP and FHR shown in FIG. 1.

FHR 8 continually monitors for the expiration of the register active timer. Upon expiration of the timer, FHR 8 is configured to send another null register message to RP 20, which also includes the source address and the group address associated with the multicast stream. After sending this additional null register message, FHR 8 restarts the register active timer. In addition, as FHR 8 receives additional multicast stream data for the multicast stream from the source, FHR 8 sends the stream data, in native format, to RP 20. FHR 8 continues this process over multiple iterations, such that is capable of continually sending additional null register messages and native multicast stream data to RP 20, where FHR 8 sends a new null register message upon each expiration of the register active timer. FIG. 2 illustrates examples of these additional null register messages 30B-30N and native multicast stream data 34B-34N. FHR 8 restarts the register active timer after sending each of the additional null register messages. Further example details of this process are illustrated in FIG. 3. Although the particular example of FIG. 2 illustrates FHR 8 sending multicast stream data 34B after it sends null register 30B to RP 20, and also illustrates FHR 8 sending multicast stream data 34N after it sends null register 30N to RP 20, multicast stream data 34B and 34N may be sent to RP 20 at any point during processing after FHR 8 has received such data from a source device, either before or after sending null register message 30B and null register message 30N, respectively.

Additionally, although the example of FIG. 2 only illustrates the transmission of multicast stream data for a particular multicast stream, FHR 8 is capable of sending non-encapsulated multicast stream data for any number of different multicast streams (e.g., stream data received from one or more of source devices 2, 4) to RP 20. FHR 8 is further operable to send one or more null register messages to RP 20, such as null register messages 30A-30N, for each respective multicast stream. Each null register message may include the source address and group address of the respective multicast stream, and each null register message may also include an indication to request that RP 20 refrain from sending any register-stop messages associated with the respective stream to FHR 8. In such fashion, in many examples, and for any number of multicast streams, FHR 8 may be configured to send only non-capsulated multicast stream data to RP 20, and RP 20 may be configured to refrain from sending any register-stop messages associated with the respective multicast streams to FHR 8, thereby significantly reducing data flow between FHR 8 and RP 20.

FIG. 3 is a flow diagram illustrating an example process that includes operations performed by RP 20 and FHR 8. In describing the example process illustrated in FIG. 3, reference will be made to the example components illustrated in FIG. 1 and the various example messages and data illustrated in FIG. 2.

In the example process of FIG. 3, FHR 8 receives initial multicast stream data from a source (50), such as source 2 shown in FIG. 1. This multicast stream data is associated with a particular multicast stream provided by the source. Upon receiving this data, FHR 8 enters an active state, sends a first null register message (e.g., null register message 30A shown in FIG. 2) to RP 20, and also starts a register active timer (52). In some non-limiting examples, the register active timer may have a value of sixty seconds. The first null register message includes the source address and the group address that are collectively associated with the multicast stream.

RP 20 receives this first null register message from FHR 8 (54), and, in response, RP 20 sends an (S, G) join control message (e.g., join control message 32) to FHR 8 (56). The join control message identifies the multicast stream by including the group address and source address of the stream.

FHR 8 receives the join control message from RP 20 (58). Both RP 20 and FHR 8 may also update their respective state information for the source and group addresses of this active stream (e.g., in stream state information 109, shown in FIG. 4, for each respective routing device).

After receiving the join control message from RP 20, FHR 8 sends the initial multicast stream data, in its native and non-encapsulated format, to RP 20 (59). RP 20 receives this native multicast stream data from FHR 8 for further processing (60). For example, RP 20 may forward this multicast stream data to one or more receiving devices (e.g., receiver device 6) via one or more intermediate routing devices, including one or more last hop routers (e.g., LHR 14) communicatively coupled to the one or more receiving devices.

FHR 8 subsequently determines if it has received additional multicast stream data associated with the multicast stream (e.g., multicast stream data 34A or 34N shown in FIG. 2) from the source device (61). If so ("YES" branch of 61), FHR 8 sends the additional multicast stream data, in its native and non-encapsulated format, to RP 20 (62). RP 20 receives this additional, non-encapsulated multicast stream data from FHR 8 for further processing (64).

After sending the additional multicast stream data to RP 20, or, alternatively, if FHR 8 has not yet received any additional multicast stream data from the source ("NO" branch of 61), FHR 8 determines whether the register active timer has expired (66). If the timer has not yet expired ("NO" branch of 66), FHR 8 again checks to determine if it has received any additional multicast stream data for the stream from the source device (61). If, however, the timer has expired ("YES" branch of 66), FHR 8 sends another null register message (e.g., null register message 30B or 30N shown in FIG. 2) to RP 20 and restarts the register active timer (68). RP 20 receives the null register message from FHR 8 (70). The null register message includes the source address and the group address associated with the multicast stream.

In various examples, RP 20 may be configured to monitor for the continued receipt of periodic null register messages that are sent from FHR 8. As shown in FIG. 3, FHR 8 is configured to periodically send a null register message to RP 20 (68). However, if there are any issues with FHR 8 (e.g., failure) or issues within network 1 (e.g., congestion, overload), RP 20 may not receive any null register messages from FHR 8 over a period of time. RP 20 may, in some examples, utilize a keep-alive timer to monitor for the continued receipt of the periodic null register messages from FHR 8. If the keep alive timer at RP 20 expires (e.g., if RP 20 does not receive a new null register message from FHR 8 within a defined period of time), RP 20 may re-set and/or delete its state information with respect to the group address and source address associated with the multicast stream (e.g., in stream state information 109 shown in FIG. 4). In non-limiting examples, the value of the keep alive timer at RP 20 may be set to at least three times the value of the register active timer (e.g., at least 180 seconds).

Figure 4:
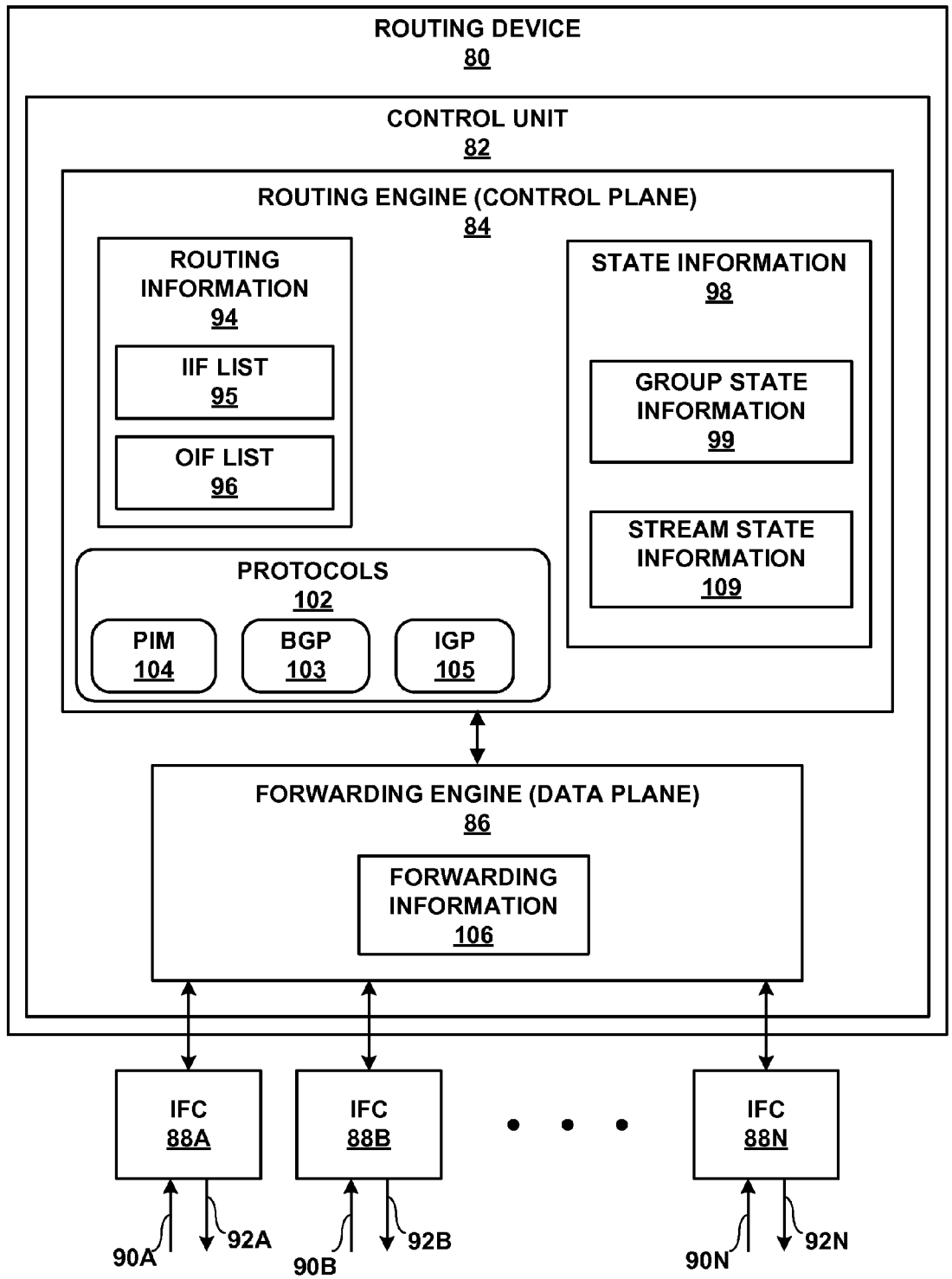
FIG. 4 is a block diagram illustrating an example routing device, such as one of the routing devices shown in FIG. 1.

FIG. 4 is a block diagram illustrating an example routing device 80, such as one of the routing devices shown in FIG. 1. For example, any of routing devices 8, 10, 12, 14, 16, 18, 20, and/or 22 may comprise routing device 80 illustrated in FIG. 4.

In this example, routing device 80 includes interface cards 88A-88N ("IFC's 88") that receive multicast data packets via incoming links 90A-90N ("incoming links 90") and send multicast data packets via outbound links 92A-92N ("outbound links 92"). IFC's 88 are typically coupled to links 90, 92 via a number of interface ports. Routing device 80 also includes a control unit 82 that determines routes of received packets and forwards the packets accordingly via IFC's 88.

Control unit 82 may comprise a routing engine 84 and a forwarding engine 86. Routing engine 84 operates as the control plane for routing device 80 and includes an operating system that may provide a multi-tasking operating environment for execution of a number of concurrent processes. Routing engine 84 may implement one or more routing protocols 102 to execute routing processes. For example, routing protocols 102 may include Border Gateway Protocol (BGP) 103, for exchanging routing information with other routing devices in a computer network (e.g., network 1) and for updating routing information 94. Protocols 102 may also include Interior Gateway Protocol (IGP) 105, such as a link state routing protocol Open Shortest Path First (OSPF) and/or Intermediate System-to-Intermediate System (IS-IS), for exchanging link state information with other routing devices.

Routing information 94 may describe a topology of the computer network in which routing device 80 resides, and may also include routes through the shared trees in the computer network. Routing information 94 describes various routes within the computer network, and the appropriate next hops for each route, e.g., the neighboring routing devices along each of the routes. In the illustrated example, routing information 94 includes an incoming interface (IIF) list 95 and an outgoing interface (OIF) list 96 that indicates which of IFC's 88 are connected to neighboring routing devices in each route. For example, a given route may comprise a route for multicast traffic for a given multicast group G. In that example, IIF list 95 may include a list of interfaces to all downstream routing devices in the shared tree, and OIF list 96 may include a list of interfaces to upstream and downstream routing devices that have state for the multicast group.

In addition, routing protocols 102 may include PIM 104, and specifically PIM SM in some examples, for routing multicast traffic through the computer network (e.g., network 1) with other routing devices conceptually formed into shared trees according to routing information 94 and state information 98. Routing engine 84 may also implement PIM 104 to update state information 98. State information 98 may describe a current status of links between routing devices in the shared trees for the network. In the illustrated example, state information 98 includes group state information 99 that describes which neighboring routing devices belong to which multicast groups within the range for the shared tree.

Routing engine 84 analyzes stored routing information 94 and state information 98 and generates forwarding information 106 for forwarding engine 86. Forwarding information 106 may associate, for example, network destinations for certain multicast groups with specific next hops and corresponding IFC's 88 and physical output ports for output links 92. Forwarding information 106 may, in some cases, be a radix tree programmed into dedicated forwarding chips, a series of tables, a complex database, a link list, a radix tree, a database, a flat file, or various other data structures. In the illustrated example of FIG. 4, forwarding information 106 includes forwarding routes that include specific routes to forward multicast traffic for a given multicast group to neighboring routing devices. In general, when routing device 80 receives a multicast packet via one of inbound links 90, control unit 82 determines a next hop for the packet in accordance with forwarding information 106, and forwards the packet according to the next hop.

As shown in FIG. 4, and as described above in reference to FIG. 2, state information 98 also includes stream state information 109. Stream state information 109 includes information associated with active streams that are serviced by routing device 80. Routing device 80 maintains and updates stream state information 109 in response to receiving register messages (e.g., null register messages 30A-30C shown in FIG. 2) from another routing device. For example, routing device 80 may receive a register message from a second routing device to indicate that one or more multicast streams have become active at the second routing device. In such an example, routing device 80 may store the source and group addresses associated with each of these active streams in stream state information 109. Stream state information 109 identifies respective source and group addresses for each active multicast stream. In some instances, routing device 80 may also store, in stream state information 109, the address (e.g., primary address) of the second routing device from which it has received the source and group address information.

Subsequently, if any of these streams are withdrawn at the second routing device, routing device 80 updates its stream state information 109 (e.g., deletes the source and group addresses for the withdrawn streams). In this way, routing device 80 is capable of continuously updating its stream state information 109 to add source and group address information for existing and active multicast streams, and to delete source and group address information for any streams that have been withdrawn. Control unit 82 may utilize routing engine 84 and/or forwarding engine 86, including protocols 102, to exchange messages (e.g., messages illustrated in FIG. 2) with other routing devices.

The architecture of routing device 80 illustrated in FIG. 4 is shown for exemplary purposes only. The disclosure is not necessarily limited to this architecture. In other examples, routing device 80 may be configured in a variety of ways. In one example, some of the functionality of control unit 82 may be distributed within IFC's 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors that execute software instructions. In that case, the various software modules of control unit 82 may comprise executable instructions stored on a computer-readable storage medium, such as computer memory or storage device.

FIG. 5 is a conceptual diagram illustrating an example representation of a null register message format. Various register messages discussed throughout this disclosure, including the null register messages 30A-30N shown in FIG. 2, may have the format shown in FIG. 5. This format is similar to that of the null register format described in RFC 4601 but with the variations described below.

As shown in FIG. 5, a null register message may include fields 150, 152, 154, 156, 158, 160, 162, 164, and 166. Field 150 has a value that specifies the PIM version, and field 152 has a value that specifies the message type. Each of fields 154 and 164 may be reserved fields that may, in some cases, have values that are merely set to zero on transmission and ignored on receipt, and field 156 is a checksum field. In non-limiting examples, field 150 is four bits in length, field 152 is four bits in length, field 154 is eight bits in length, field 156 is sixteen bits in length, and field 164 is twenty nine bits in length.

Field 158 is a border field. As described in RFC 4601, if FHR 8 is a router for a source to which it is directly connected, field 158 is set to zero. If, however, FHR 8 is a PIM multicast border router for a source in a directly connected cloud, field 158 is set to one. In non-limiting examples, field 158 is one bit in length.

Field 160 is a null-register indicator field. Field 160 is set to one if FHR 8 is sending a null register message to RP 20. Otherwise, field 160 is set to zero. In non-limiting examples, field 160 is one bit in length. In the example of FIG. 2, each of null register messages 30A-30N has field 160 set to one.

Field 162 is a field indicating whether a response to the null register message is required from RP 20 (i.e., a "response not required" field). Field 162 is set to one when FHR 8 is not expecting or requiring any register stop messages for a particular multicast stream from RP 20. This value may comprise a predefined set value of specified field 162. Otherwise, field 162 is set to zero. RP 20 is configured to refrain from sending register stop messages associated with a particular multicast stream if field 162 is set to one. In non-limiting examples, field 162 is one bit in length. In the example of FIG. 2, each of null register messages 30A-30N has field 162 set to one.

Field 166 is a field that includes information about the multicast stream associated with the register message. For example, field 166 may include the source address and group address associated with the multicast stream (e.g., IPv4 stream, IPv6 stream). As described in RFC 4601, field 166 may include a dummy IP header with source address set to the source address associated with the multicast stream, and the destination address set to the group address associated with the multicast stream. RFC 4601 also provides further details about certain field settings for IPv4 streams and IPv6 streams. In non-limiting examples, field 166 is thirty two*N bits in length, where N is an integer greater than or equal to one.

Figure 6:
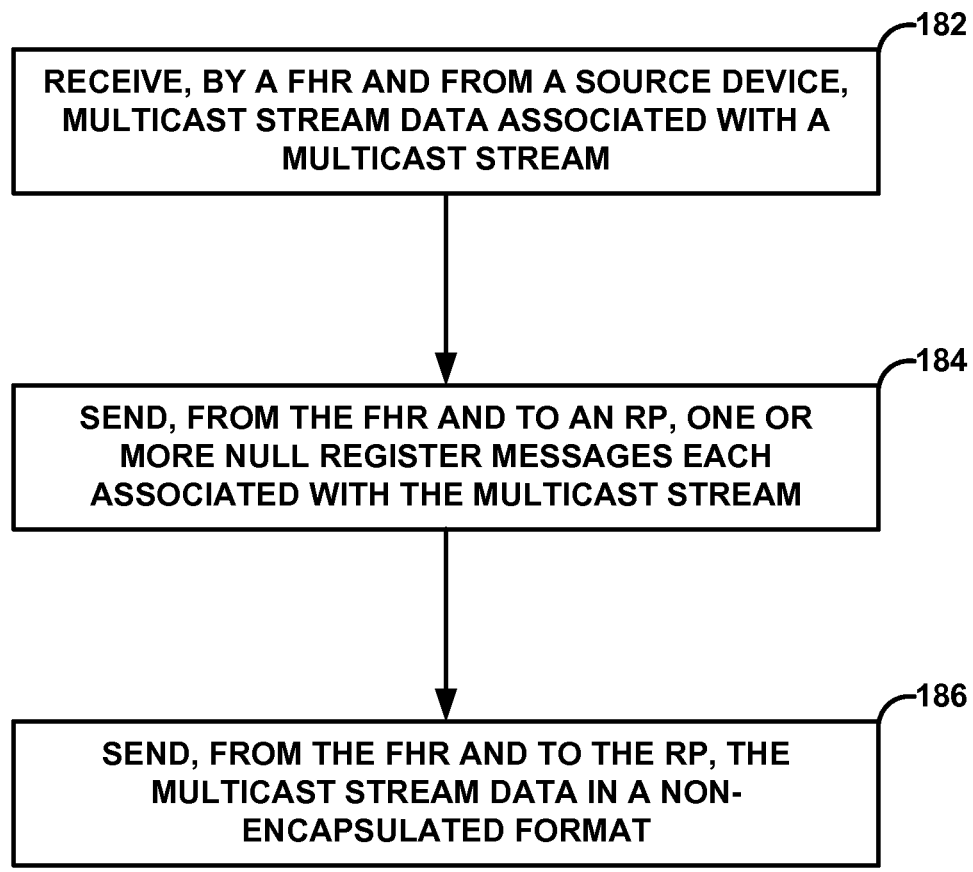
FIG. 6 is a flow diagram illustrating an example process that may be implemented by a routing device, such as one of the routing devices shown in FIG. 1.

FIG. 6 is a flow diagram illustrating an example process that may be implemented by a routing device, such as one of the routing devices shown in FIG. 1. The example process illustrated in FIG. 6 includes operations 182, 184, and 186, as well as various other possible operations recited below. For purposes of illustration only in the description below, it will be assumed that the example operations illustrated in FIG. 6 are implemented by FHR 8.

As shown in FIG. 6, FHR 8 may receive, from a source device (e.g., source device 2), multicast stream data associated with a multicast stream (182). FHR 8 may send, to RP 20 using a PIM protocol, one or more null register messages (e.g., null register message 30A, 30B, and/or 30N shown in FIG. 2) that are each associated with the multicast stream provided by the source device (184). Each of the one or more null register messages includes a source address and a group address that are collectively associated with the multicast stream, and each of the one or more null register messages associated with the multicast stream further includes an indication (e.g., a value of field 162 shown in FIG. 5) to request that RP 20 refrain from sending any register-stop messages associated with the multicast stream to FHR 8.

In some examples, sending the one or more null register messages that are each associated with the multicast stream comprises sending, from FHR 8 and to RP 20, a first null register message (e.g., null register message 30A). After sending the first null register message, FHR 8 receives, from the RP 20, a join control message (e.g., join message 32 sent from RP 20) that includes the source address and the group address collectively associated with the multicast stream.

After sending the one or more null register messages that are each associated with the multicast stream, FHR 8 sends, to RP 20, the multicast stream data associated with the multicast stream (e.g., native multicast stream data 34A shown in FIG. 2) in a non-encapsulated format (186). Sending the multicast stream data in the non-encapsulated format from FHR 8 to RP 20 may include, responsive to receiving the join control message from RP 20, sending, from FHR 8 and to RP 20, the multicast stream data in the non-encapsulated format.

In some examples, sending the one or more null register messages that are each associated with the multicast stream further comprises sending, from FHR 8 and to RP 20, a first null register message (e.g., null register message 30B). After sending the first null register message, FHR 8 sends, to RP 20, a second null register message (e.g., null register message 30N) different from the first null register message. In some cases, after sending the first null register message, FHR 8 starts a register active timer, and, responsive to determining that the register active timer has expired, FHR 8 sends, to RP 8, the second null register message. After the register active timer has expired, FHR 8 may restart the register active timer. FHR 8 may also receive, from the source device, additional multicast stream data associated with the multicast stream, and FHR 8 may send, to RP 20, the additional multicast stream data associated with the multicast stream in the non-encapsulated format (e.g., multicast stream data 34B). FHR 8 may repeat the sending of the one or more null register messages that are each associated with the multicast stream, the receiving of the additional multicast stream data associated with the multicast stream, and the sending of the additional multicast stream data associated with the multicast stream in the non-encapsulated format.

The indication included in each of the one or more null register messages to request that the RP refrain from sending any register-stop messages associated with the multicast stream to the FHR may include a predefined set value of a specified field of each of the one or more null register messages (e.g., value of one for field 162 show in FIG. 5). The multicast stream data in the non-encapsulated format sent from FHR 8 to RP 20 may not be encapsulated in any PIM data register messages.

In some examples, the source device is a first source device and the multicast stream is a first multicast stream. In these examples, the operations may further include receiving, by FHR 8 and from a second source device (e.g., source device 4), multicast stream data associated with a second multicast stream, where the second source device is different from the first source device, and where the second multicast stream is different from the first multicast stream. The operations may further include sending, from FHR 8 and to RP 20 using the PIM protocol, one or more null register messages that are each associated with the second multicast stream provided by the second source device, where each of the one or more null register messages associated with the second multicast stream includes a source address and a group address that are collectively associated with the second multicast stream, and where each of the one or more null register messages associated with the second multicast stream further includes an indication to request that RP 20 refrain from sending any register-stop messages associated with the second multicast stream to FHR 8. After sending the one or more null register messages that are associated with the second multicast stream, FHR 8 may send, to RP 20, the multicast stream data associated with the second multicast stream in the non-encapsulated format.

The techniques described in this disclosure may be implemented, at least in part, in hardware, software, firmware or any combination thereof. For example, various aspects of the described techniques may be implemented within one or more processors, including one or more microprocessors, digital signal processors (DSP's), application specific integrated circuits (ASIC's), field programmable gate arrays (FPGA's), or any other equivalent integrated or discrete logic circuitry, as well as any combinations of such components. The term "processor," "processing circuitry," or "hardware processor" may generally refer to any of the foregoing logic circuitry, alone or in combination with other logic circuitry, or any other equivalent circuitry. A control unit comprising hardware may perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform one or more operations of a method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the disclosure have been described. These and other examples are within the scope of the following claims.

The invention claimed is:

1. A method comprising:
   receiving, by a first hop router (FHR) and from a source device, multicast stream data associated with a multicast stream;
   before receiving a join control message that includes a source address and a group address collectively associated with the multicast stream:
      creating, by the FHR, one or more null register messages that are each associated with the multicast stream provided by the source device, wherein each of the one or more null register messages associated with the multicast stream includes the source address and the group address that are collectively associated with the multicast stream, and wherein each of the one or more null register messages associated with the multicast stream further includes an indication to request that the RP refrain from sending any register-stop messages associated with the multicast stream to the FHR; and
      sending, from the FHR and to a rendezvous point (RP) using a Protocol Independent Multicast (PIM) protocol, the one or more null register messages that are each associated with the multicast stream; and
   after sending the one or more null register messages that are each associated with the multicast stream:
      receiving, by the FHR and from the RP, the join control message that includes the source address and the group address collectively associated with the multicast stream; and
      after receiving the join control message, sending, from the FHR and to the RP, the multicast stream data associated with the multicast stream in a non-encapsulated format, wherein the FHR does not receive any register-stop messages associated with the multicast stream from the RP.

2. The method of claim 1, wherein sending the one or more null register messages that are each associated with the multicast stream comprises sending, from the FHR and to the RP, a first null register message, and wherein the method further comprises:
after sending the first null register message, sending, from the FHR and to the RP, a second null register message different from the first null register message, wherein the second null register message includes the source address and the group address collectively associated with the multicast stream, and wherein the second null register message further includes the indication to request that the RP refrain from sending any register-stop messages associated with the multicast stream to the FHR.

3. The method of claim 2, further comprising:
after sending the first null register message, starting a register active timer;
responsive to determining that the register active timer has expired:
sending, from the FHR and to the RP, the second null register message; and
restarting, by the FHR, the register active timer.

4. The method of claim 3, wherein the method further comprises:
responsive to determining that the register active timer has expired, sending, by the FHR and to the RP, one or more additional null register messages that each include the source address and the group address collectively associated with the multicast stream, wherein each of the one or more additional null register messages includes the indication to request that the RP refrain from sending any register-stop messages associated with the multicast stream to the FHR;
receiving, by the FHR and from the source device, additional multicast stream data associated with the multicast stream; and
sending, from the FHR and to the RP, the additional multicast stream data associated with the multicast stream in the non-encapsulated format.

5. The method of claim 4, further comprising:
repeating the sending of the one or more additional null register messages that are each associated with the multicast stream, the receiving of the additional multicast stream data associated with the multicast stream, and the sending of the additional multicast stream data associated with the multicast stream in the non-encapsulated format.

6. The method of claim 1, wherein the indication included in each of the one or more null register messages to request that the RP refrain from sending any register-stop messages associated with the multicast stream to the FHR comprises a predefined set value of a specified field of each of the one or more null register messages.

7. The method of claim 1, wherein the source device comprises a first source device, wherein the multicast stream comprises a first multicast stream, wherein the join control message comprises a first join control message, and wherein the method further comprises:
receiving, by the FHR and from a second source device, multicast stream data associated with a second multicast stream, wherein the second source device is different from the first source device, and wherein the second multicast stream is different from the first multicast stream;
before receiving a second join control message that includes a source address and a group address collectively associated with the second multicast stream:
creating, by the FHR, one or more null register messages that are each associated with the second multicast stream provided by the second source device, wherein each of the one or more null register messages associated with the second multicast stream includes the source address and the group address that are collectively associated with the second multicast stream, and wherein each of the one or more null register messages associated with the second multicast stream further includes an indication to request that the RP refrain from sending any register-stop messages associated with the second multicast stream to the FHR; and
sending, from the FHR and to the RP, the one or more null register messages that are each associated with the second multicast stream; and
after sending the one or more null register messages that are associated with the second multicast stream:
receiving, by the FHR and from the RP, the second join control message that includes the source address and the group address collectively associated with the second multicast stream; and
after receiving the second join control message, sending, from the FHR and to the RP, the multicast stream data associated with the second multicast stream in the non-encapsulated format,
wherein the FHR does not receive any register-stop messages associated with the second multicast stream from the RP.

8. The method of claim 1, wherein the multicast stream data in the non-encapsulated format sent from the FHR to the RP is not encapsulated in any PIM data register messages.

9. A routing device, comprising:
at least one processor; and
a computer-readable storage medium storing instructions that cause the at least one processor to:
receive, from a source device, multicast stream data associated with a multicast stream;
before receiving a join control message that includes a source address and a group address collectively associated with the multicast stream:
create one or more null register messages that are each associated with the multicast stream provided by the source device, wherein each of the one or more null register messages associated with the multicast stream includes the source address and the group address that are collectively associated with the multicast stream, and wherein each of the one or more null register messages associated with the multicast stream further includes an indication to request that the RP refrain from sending any register-stop messages associated with the multicast stream to the routing device; and
send, to a rendezvous point (RP) using a Protocol Independent Multicast (PIM) protocol, the one or more null register messages that are each associated with the multicast stream; and
after sending the one or more null register messages that are each associated with the multicast stream:

receive, from the RP, the join control message that includes the source address and the group address collectively associated with the multicast stream; and after receiving the join control message, send, to the RP, the multicast stream data associated with the multicast stream in a non-encapsulated format, wherein the routing device does not receive any register-stop messages associated with the multicast stream from the RP.

10. The routing device of claim 9, wherein the instructions stored on the computer-readable storage medium that cause the at least one processor to send the one or more null register messages that are each associated with the multicast stream cause the one processor to send, to the RP, a first null register message, and wherein the instructions stored on the computer-readable storage medium further cause the at least one processor to:

after sending the first null register message, send to the RP, a second null register message different from the first null register message, wherein the second null register message includes the source address and the group address collectively associated with the multicast stream, and wherein the second null register message further includes the indication to request that the RP refrain from sending any register-stop messages associated with the multicast stream to the routing device.

11. The routing device of claim 10, wherein the instructions stored on the computer-readable storage medium further cause the at least one processor to:

after sending, to the RP, the first null register message, start a register active timer;

responsive to determining that the register active timer has expired:

send, sending, to the RP, the second null register message; and restart the register active timer.

12. The routing device of claim 11, wherein the instructions stored on the computer-readable storage medium further cause the at least one processor to:

responsive to determining that the register active timer has expired, send, to the RP, one or more additional null register messages that each include the source address and the group address collectively associated with the multicast stream, wherein each of the one or more additional null register messages includes the indication to request that the RP refrain from sending any register-stop messages associated with the multicast stream to the routing device;

receive, from the source device, additional multicast stream data associated with the multicast stream; and send, to the RP, the additional multicast stream data associated with the multicast stream in the non-encapsulated format.

13. The routing device of claim 12, wherein the instructions stored on the computer-readable storage medium further cause the at least one processor to repeat the sending of the one or more additional null register messages that are each associated with the multicast stream, the receiving of the additional multicast stream data associated with the multicast stream, and the sending of the additional multicast stream data associated with the multicast stream in the non-encapsulated format.

14. The routing device of claim 9, wherein the indication included in each of the one or more null register messages to request that the RP refrain from sending any register-stop messages associated with the multicast stream to the routing device comprises a predefined set value of a specified field of each of the one or more null register messages.

15. The routing device of claim 9, wherein the source device comprises a first source device, wherein the multicast stream comprises a first multicast stream, wherein the join control message comprises a first join control message, and wherein the instructions stored on the computer-readable storage medium further cause the at least one processor to:

receive, from a second source device, multicast stream data associated with a second multicast stream, wherein the second source device is different from the first source device, and wherein the second multicast stream is different from the first multicast stream;

before receiving a second join control message that includes a source address and a group address collectively associated with the second multicast stream:

create one or more null register messages that are each associated with the second multicast stream provided by the second source device, wherein each of the one or more null register messages associated with the second multicast stream includes the source address and the group address that are collectively associated with the second multicast stream, and wherein each of the one or more null register messages associated with the second multicast stream further includes an indication to request that the RP refrain from sending any register-stop messages associated with the second multicast stream to the routing device; and send, to the RP, the one or more null register messages that are each associated with the second multicast stream; and after sending the one or more null register messages that are associated with the second multicast stream:

receive, from the RP, the second join control message that includes the source address and the group address collectively associated with the second multicast stream; and after receiving the second join control message, send, to the RP, the multicast stream data associated with the second multicast stream in the non-encapsulated format, wherein the routing device does not receive any register-stop messages associated with the second multicast stream from the RP.

16. The routing device of claim 9, wherein the multicast stream data in the non-encapsulated format sent from the routing device to the RP is not encapsulated in any PIM data register messages.

17. A method comprising:

before sending a join control message that includes a source address and a group address collectively associated with a multicast stream, receiving, by a rendezvous point (RP) and from a first hop router (FHR) using a Protocol Independent Multicast (PIM) protocol, one or more null register messages that are each associated with the multicast stream, wherein each of the one or more null register messages includes the source address and the group address that are collectively associated with the multicast stream, and wherein each of the one or more null register messages further includes an indication to request that the RP refrain from sending any register-stop messages associated with the multicast stream to the FHR; and after receiving the one or more null register messages:
- sending, by the RP and to the FHR, the join control message that includes the source address and the group address collectively associated with the multicast stream; and
- after sending the join control message, receiving, by the RP and from the FHR, multicast stream data associated with the multicast stream in a non-encapsulated format, wherein after receiving the one or more null register messages, the RP refrains from sending any register-stop messages associated with the multicast stream to the FHR.

18. A routing device, comprising:
- at least one processor; and
- a computer-readable storage medium storing instructions that cause the at least one processor to:
  - before sending a join control message that includes a source address and a group address collectively associated with a multicast stream, receive, from a first hop router (FHR) using a Protocol Independent Multicast (PIM) protocol, one or more null register messages that are each associated with the multicast stream, wherein each of the one or more null register messages includes the source address and the group address that are collectively associated with the multicast stream, and wherein each of the one or more null register messages further includes an indication to request that the routing device refrain from sending any register-stop messages associated with the multicast stream to the FHR; and
  - after receiving the one or more null register messages:
    - send, to the FHR, the join control message that includes the source address and the group address collectively associated with the multicast stream; and
    - after sending the join control message, receive, from the FHR, multicast stream data associated with the multicast stream in a non-encapsulated format,
  - wherein responsive to receiving the one or more null register messages, the routing device refrains from sending any register-stop messages associated with the multicast stream to the FHR.

\* \* \* \* \*